US012242832B1

(12) United States Patent
Wimmer et al.

(10) Patent No.: US 12,242,832 B1
(45) Date of Patent: Mar. 4, 2025

(54) CROSS COMPILATION UNIT SPARSE CONDITIONAL CONSTANT PROPAGATION

(71) Applicant: Oracle International Corporation, Redwood Shores, CA (US)

(72) Inventors: Christian Wimmer, Foster City, CA (US); Liviu Codrut Stancu, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 78 days.

(21) Appl. No.: 18/452,842

(22) Filed: Aug. 21, 2023

(51) Int. Cl.
*G06F 8/41* (2018.01)

(52) U.S. Cl.
CPC ............ *G06F 8/4441* (2013.01); *G06F 8/433* (2013.01)

(58) Field of Classification Search
CPC .............................. G06F 8/433; G06F 8/4441
USPC ......................................... 717/140, 151, 156
See application file for complete search history.

(56) References Cited

U.S. PATENT DOCUMENTS

| | | | | |
|---|---|---|---|---|
| 5,493,675 | A * | 2/1996 | Faiman, Jr. | ............. G06F 8/447 717/146 |
| 6,760,905 | B1 * | 7/2004 | Hostetter | ............ G06F 9/44521 717/136 |
| 2015/0012729 | A1 * | 1/2015 | Robison | .................... G06F 8/41 712/216 |

OTHER PUBLICATIONS

Manuel Eberl et al., "A Verified Compiler for Probability Density Functions", [Online], p. 1-31, [Retrieved from Internet on Dec. 14, 2024], <https://arxiv.org/pdf/1707.06901> (Year: 2015).*

(Continued)

*Primary Examiner* — Ziaul A Chowdhury
(74) *Attorney, Agent, or Firm* — Lathrop GPM LLP

(57) ABSTRACT

A flow graph of a first compilation unit of the program is expanded. The first corresponding parameter states of statements of the first compilation unit are marked as empty. The statements of the first compilation unit are processed to update the first corresponding parameter states with an exact type and a value set. Processing the statements include tracking a control flow predicate of a block in the first compilation unit, wherein the block comprises a first subset of the statements. Only after the control flow predicate indicates that the block is executable, the method includes processing an invocation statement in the first subset of the first statements, and expanding, responsive to the invocation statement, the flow graph for a second compilation unit of the program that is identified by the invocation statement.

20 Claims, 8 Drawing Sheets

(56) References Cited

OTHER PUBLICATIONS

Wegman, Mark N. and Zadeck, F. Kenneth., "Constant Propagation with Conditional Branches." ACM Transactions on Programming Languages and Systems, 13(2), Apr. 1, 1991, pp. 181-210. 30 pages.
Click, Clifford and Cooper, Keith., "Combining Analyses, Combining Optimizations", ACM Transactions on Programming Languages and Systems, 17(2), Feb. 1, 1995, 151 pages.
Michael Hind. "Pointer Analysis: Haven't We Solved This Problem Yet?". In Proceedings of the 2001 ACM, Jun. 18-19, 2001, 8 pages.
Yannis Smaragdakis and George Balatsouras. "Pointer Analysis". Foundations and Trends in Programming Languages 2, 1 (2015), 1-69, Jan. 1, 2015. https://doi.org/10.1561/2500000014, 72 pages.
Manu Sridharan, Satish Chandra, Julian Dolby, Stephen J. Fink, and Eran Yahav. "Alias Analysis for Object-Oriented Programs.", Jan. 1, 2013, https://doi.org/10.1007/978-3-642-36946-9_8, 39 pages.
Barbara G. Ryder. "Dimensions of Precision in Reference Analysis of Object-Oriented Programming Languages". In Compiler Construction, Jan. 1, 2003, 12 pages.

* cited by examiner

400

```
static void main() {
        compute(new A()).foo();
} static I compute(I input) {
        int x = input instanceof B ? 2 : 1;
        while (true) {
                if (x < 3) return create(x);
                x++;
        }
} static I create(int which) {
        switch (which) {
                case 1: return new A();
                case 2: return new B();
                default: return null;
        }
} interface I {
        void foo();
} class A implements I {
        void foo() { }
} class B implements I {
        void foo() { }
} class C implements I {
        void foo() { }
}
```

FIG. 4A

| Id | Node | Original stamps | Stamps with whole-program SCCP |
|---|---|---|---|
| 1 | Param: input | object, type I, can be null | object, exact type A, never null |
| 7 | Const: 2 | int, min=2, max=2 | (removed as dead code) |
| 8 | Const: 1 | int, min=1, max=1 | |
| 9 | Phi | int, min=1, max=2 | (replaced with "8 Const: 1") |
| 11 | Phi | int, unrestricted | (replaced with "8 Const: 1") |
| 15 | Increment | int, unrestricted | (removed as dead code) |
| 18 | Invoke: create | object, type I, can be null | object, exact type A, never null |

CROSS COMPILATION UNIT SPARSE CONDITIONAL CONSTANT PROPAGATION

BACKGROUND

In programming, the source code of a program has classes with methods in the classes, or functional equivalents thereof. In order to execute a program, the source code of the program is compiled. During compilation, the compiler evaluates the program and performs various optimizations on the program. Compilers create compilation units from the methods. The compiler then generally evaluates and performs optimizations on a per compilation unit basis. For example, to create a compilation unit, the compiler may use points-to analysis to evaluate the number of variables that escape to a second method at a call site of a first method. Each method is an individual compilation unit initially. The compiler then applies a heuristic on the number of variables that escape and the code size to determine whether to inline the second method into the first method. If the compiler determines to perform inlining, the compiler inlines the second method into the first method by replacing the callsite in the first method with the code of the second method. The result of the inlining is to create a single compilation unit having both the first and the second method. Only after performing the inlining and creating the single compilation unit does the compiler perform optimizations on the code in the single compilation unit. Namely, because the same second method may be called from different callsites of different other methods, the compiler does not optimize the code of the second method to consider the code of the first method without performing the inlining first. The inlined code effectively becomes part of the first method, but is referred to as a compilation unit. While inlining decreases program execution time, inlining too much increases program size. Thus, optimizations that could otherwise be safely performed are not performed.

SUMMARY

In general, in one aspect, one or more embodiments relate to a method that includes the following operations while compiling a program. A flow graph of a first compilation unit of the program is expanded. The first corresponding parameter states of statements of the first compilation unit are marked as empty. The statements of the first compilation unit are processed to update the first corresponding parameter states with an exact type and a value set. Processing the statements include tracking a control flow predicate of a block in the first compilation unit, wherein the block comprises a first subset of the statements, and only after the control flow predicate indicates that the block is executable, processing an invocation statement in the first subset of the first statements, and expanding, responsive to the invocation statement, the flow graph for a second compilation unit of the program that is identified by the invocation statement. Expanding the flow graph includes propagating the exact type and the value set of an actual parameter state to a formal parameter state of an input parameter of the second compilation unit, the actual parameter state in the first corresponding parameter states. The method further includes optimizing the program using the first corresponding parameter states to generate a compiled program.

In general, in one aspect, one or more embodiments relate to a computing system comprising at least one computer processor, and a compiler executing on the computer processor for performing operations. The operations include expanding a flow graph of a first compilation unit of a program, marking a first corresponding parameter states of a first statements of the first compilation unit as empty, and processing the first statements to update the first corresponding parameter states with an exact type and a value set. Processing the first statements includes processing an invocation statement of the first statements, and expanding, responsive to the invocation statement, the flow graph for a second compilation unit of the program. The second compilation unit is identified by the invocation statement. Expanding the flow graph includes propagating the exact type and the value set of an actual parameter state to a formal parameter state of an input parameter of the second compilation unit, the actual parameter state in the first corresponding parameter states. The value set comprises at least one of a primitive value and a constant value. The processing further includes optimizing the program using the first corresponding parameter states to generate a compiled program.

In general, in one aspect, one or more embodiments relate to a non-transitory computer readable medium comprising computer readable program code for causing a computer system to perform operations. The operations include expanding a flow graph of a first compilation unit of the program, marking a first corresponding parameter states of a first statements of the first compilation unit as empty, and processing the first statements to update the first corresponding parameter states with an exact type and a value set. Processing the first statements includes processing an invocation statement of the first statements, and expanding, responsive to the invocation statement, the flow graph for a second compilation unit of the program. The compilation unit is identified by the invocation statement. Expanding the flow graph comprises propagating the exact type and the value set of an actual parameter state to a formal parameter state of an input parameter of the second compilation unit, the actual parameter state in the first corresponding parameter states. The value set comprises at least one of a primitive value and a constant value. The operations further include optimizing the program using the first corresponding parameter states to generate a compiled program.

Other aspects of the invention will be apparent from the following description and the appended claims.

BRIEF DESCRIPTION OF DRAWINGS

FIG. 4A, FIG. 4B, FIG. 4C, and FIG. 4D show an example in accordance with one or more embodiments.

Like elements in the various figures are denoted by like reference numerals for consistency.

DETAILED DESCRIPTION

In general, embodiments are directed to cross compilation units sparse conditional constant propagation (SCCP) using a flow graph. A flow graph includes parameter states that include an exact type and value set of parameters. The exact type is the determined type of the parameter. The value set is the set of one or more values that a parameter may take during execution based on the statements in the program. Initially, the parameter set is set to empty. During analysis of the statements of program, the parameter set is updated to include the exact type and the value set. Some of the statements may be an invocation statement in which a first compilation unit calls a second compilation unit at a callsite. The call is performed with actual parameters of the first compilation unit being used as the input parameters of the second compilation unit. For the invocation statement, the exact type and the value set of the actual parameters are used to populate the parameter state of the input parameters of the second compilation unit. Thus, the analysis is performed cross compilation units. The parameter state of the input parameters may then be used to analyze the second compilation unit. The next and subsequent times that a callsite to the second compilation unit is evaluated, the parameter state of the second compilation unit is updated. After building the flow graph with the updated parameter states, optimizations may be performed. For example, the optimizations may include removing statements having empty parameter statements. Because the parameter states are updated across multiple compilation units, more optimizations may be performed than if only general type information were passed. Thus, the result is a more optimized program having faster execution time.

Figure 1:
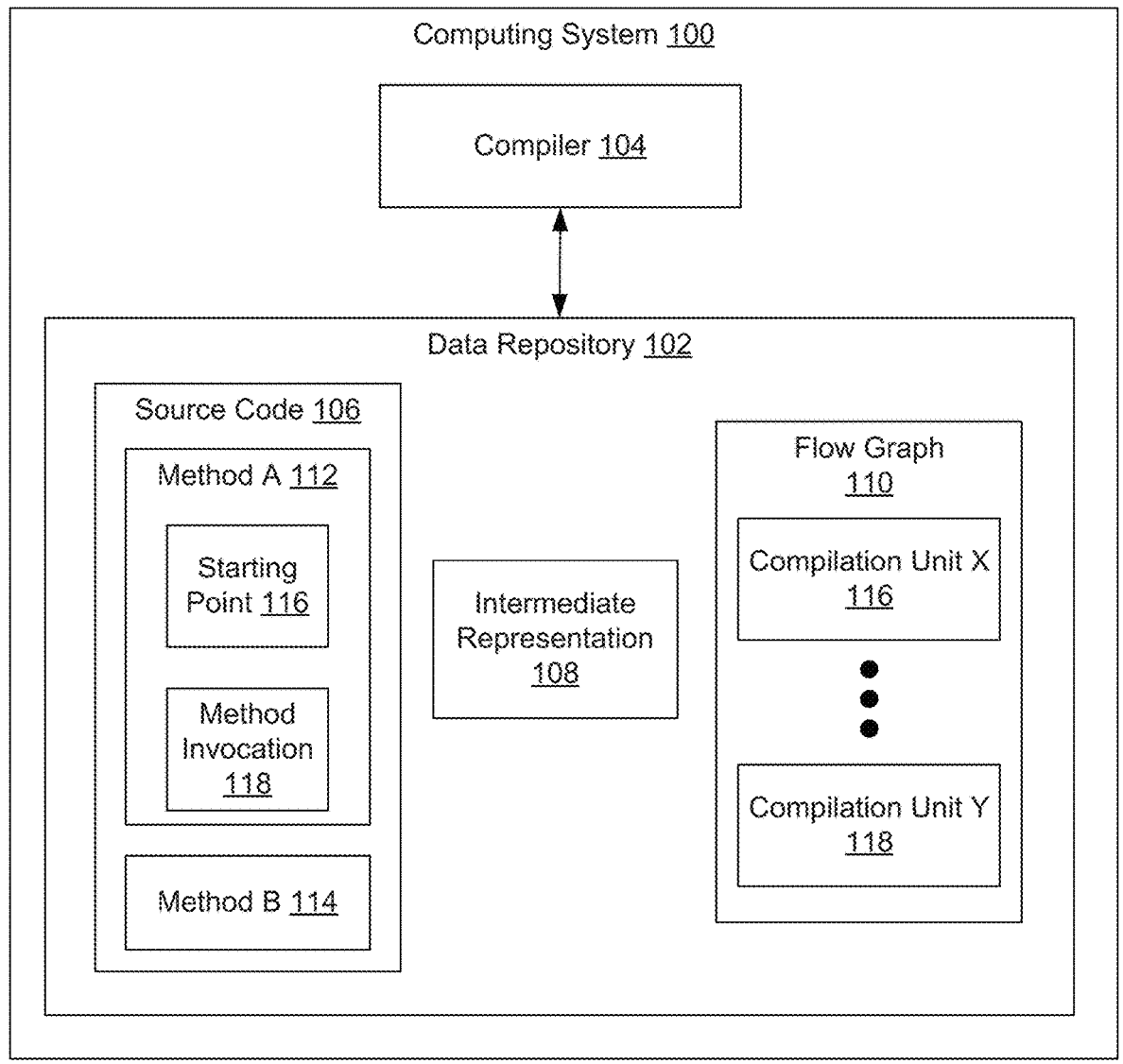
FIG. 1 is a diagram of a system in accordance with one or more embodiments.
Figure 5A:
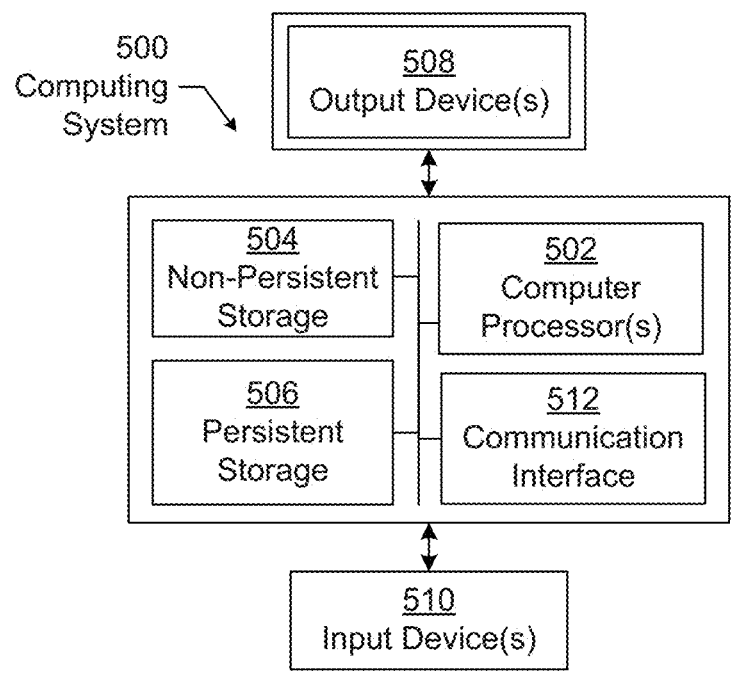
FIG. 5A and FIG. 5B show a computing system in accordance with one or more embodiments of the invention.
Figure 5B:
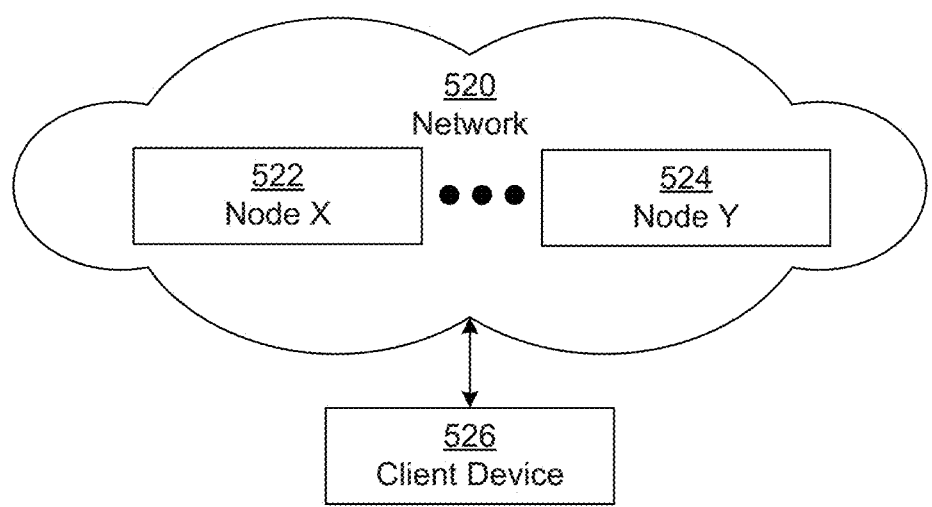

Turning to the Figures, FIG. 1 shows a diagram of a computing system (100) in accordance with one or more embodiments. The hardware of the computing system (100) is shown in FIG. 5A and FIG. 5B. As shown in FIG. 1, the computing system includes a data repository (102) connected to a compiler (104).

The data repository (102) is any type of storage unit and/or device (e.g., a file system, database, data structure, or any other storage mechanism) for storing data. Further, the data repository (102) may include multiple different, potentially heterogeneous, storage units and/or devices.

The data repository (102) includes source code (106), an intermediate representation (108), and a flow graph (110). In one or more embodiments, the source code (106) may be any collection of code including various software components. That is, the source code (106) may be any collection of computer instructions written in a programming language. The source code (106) may be transformed by the compiler (104) into binary machine code. Compiled machine code may then be executed by a processor (e.g., contained in computer system (100)) in order to execute the software components generated from the code (106).

In one or more embodiments, the source code (106) may include definitions of one or more methods (e.g., method A (112), method B (114)). A method includes a subset of the computer instructions of the source code (106). In one or more embodiments, the term method complies with the standard definition used in the art of object oriented programming languages. Specifically, a method is a programmed procedure that is defined as part of a class and is available to any object instantiated from the class. A method defines a behavior of the object instantiated from the class.

Although FIG. 1 shows the source code (106) as being written in an object oriented programming language, one or more embodiments may be applied more broadly to any type of programming language that has separate groupings of code which may be invoked with an invocation statement. Thus, the term method, as used herein, refers more broadly to include any functional equivalent in other types of programming languages.

Although only two methods are shown, the two methods are merely for illustrative purposes. Further, the classes, interfaces, and other components of the source code are not shown in order to avoid complicating the Figure.

A method (e.g., method A (112), method B (114)) includes a starting point (116) and may include one or more method invocations. A starting point is the first statement of the method that is executed when the method is executed. The starting point may be an entry point in the program. As another example, the starting point (116) may be an initial statement of the method.

A method invocation is a call to another method in the same class or in a different class. For example, method A (112) may include a method invocation that invokes method B (114). Method B may invoke other method(s), and method A may have other method invocations. The method invocation is at a callsite. A callsite is a location in the calling method (e.g., method A) to the called or invoked method.

The method being invoked has a set of input parameters. The input parameters is the input to the method. For example, input parameters may be referred to as the formal parameters of the method. Input parameters may each have a defined type. When invoked, the callsite may include arguments. The arguments are the actual parameters that are used as input to the program. In the source code, prior to execution of the program, the arguments are placeholders that identify the actual values that are passed to the invoked method. When executed, the arguments are populated with the actual values.

The source code (106) of the program may be processed and represented in an intermediate representation (108). The intermediate representation (108) is a representation of the instructions of the source code (106). In one or more embodiments, the intermediate representation is a directed graph, referred to as an IR graph, that represents the data flow and the control flow of a program. The directed graph may be in static single assignment (SSA) form. The directed graph includes multiple intermediate representation (IR) nodes. Each IR node produces at most one value. For example, the IR node may be for an operand or an operator of a statement in the program. To represent data flow, an IR node has input edges pointing to the IR nodes that produce its operands. To represent control flow, an IR node has successor edges pointing to its successors. Thus, the IR graph is a superposition of two directed graphs: the data-flow graph and the control-flow graph. Control flow edges and data flow edges are in opposite directions. IR nodes are not necessarily fixed to a specific point in the control flow. The control-flow graph provides a backbone around which most other nodes are floating. The floating nodes are only constrained by their data-flow edges, i.e., input values as well as additional dependencies such as memory dependencies and guarding dependencies. The dependencies maintain the program semantics but allow more freedom of movement for operations.

The source code (106) may also be represented as a flow graph (110) that is the graph of the control flow of the program. The flow graph (110) may include nodes each corresponding to a statement in the source code (106), where the flow of control between statements is indicated via edges between nodes. In one or more embodiments, an edge of the flow graph (110) may correspond to a flow tuple that defines a flow between a source variable and a sink variable. For example, an edge (s, t) in the flow graph (110) may indicate that statement t is executed after statement s, such that a value flows from the source variable defined in statement s to the sink variable defined in statement t. The flow graph (110) may include a chain of statements in the source code (106) through which allocation sites flow to a series of variables starting from the statement in which a variable is directly assigned the allocation site. The flow graph (110) may include several such chains of statements for each points-to tuple.

In the flow graph (110), the partitioning of the code is maintained by partitioning the flow graph into compilation units (e.g., compilation unit X (116), compilation unit Y (118)). Before analysis, the methods of the programs are the compilation units. When methods are inlined at callsites, the compilation unit of the invoked method and the compilation unit of the callee method (method having the callsite) become a single compilation unit. Calls to the compilation unit, including from the same compilation unit, are to the compilation unit as a whole and not to a particular location within the compilation unit.

Continuing with FIG. 1, the compiler (104) is a program that converts instructions into a machine-code or lower-level form so that the program can be read and executed by a computing system. The compiler (104) is configured to perform that static analysis of the program and perform optimizations as described herein.

Figure 2:
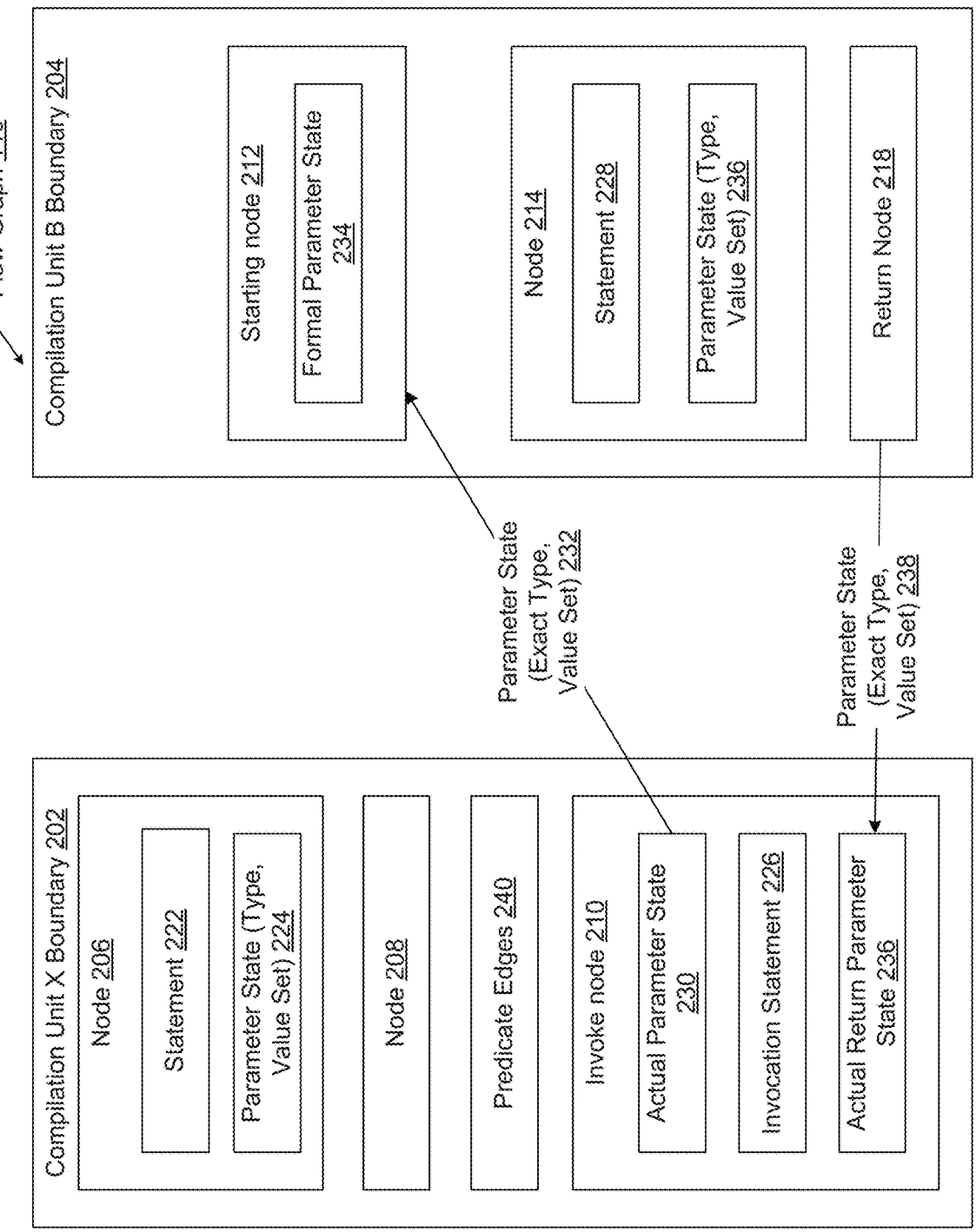
FIG. 2 is a flow graph in accordance with one or more embodiments.

FIG. 2 shows a diagram of a flow graph (110) in accordance with one or more embodiments. As shown in FIG. 2, the flow graph (110) maintains the partitioning of the code into compilation units by keeping boundaries between compilation units (e.g., compilation unit X boundary (202), compilation unit Y boundary (204)). A compilation unit boundary is a construct that identifies the separation of one compilation unit from another compilation unit.

Within the compilation unit, the statements of the program are stored in individual nodes (206, 208, 210, 212, 214, 218). A node includes a statement (222, 226, 228) and corresponding parameter states (224, 230, 232, 234, 236). Some nodes are shown without contents in FIG. 2 in order to avoid cluttering the figure.

The statement includes an operation and the parameters on which the operation is being performed. The statement may be an instruction of the source code or a portion of an instruction of the source code.

The parameter state has an exact type and value set of parameters identified by the statement. The exact type is the particular type that the parameter is determined to be based on an analysis of the flow graph by the compiler. The value set is the set of values that a parameter may be based on the analysis of the flow graph. For a constant or variable, the value set may be discrete values or a range of values of the constant. For objects, the value set may be whether the object could be null or is not null. Thus, in addition to objects, the parameter state tracks primitive values. Initially, the parameter state is an empty state. The empty state indicates that the value set is empty and no exact type is defined.

For statements that are callsites, the node is an invoke node. An invoke node (e.g., invoke node (210)) has an actual parameter state (230) of actual parameters being passed by the call to the invoked compilation unit. Specifically, the actual parameter state has the exact type and value set (as described above) for each parameter being passed to a compilation unit. The actual parameter state with the exact type and value set is propagated (232) to the formal parameter state (234) of the starting node (212) of the compilation unit being called. Thus, the formal parameter state (234) is populated with the actual parameter state of the calling node (e.g., invoke node (210)). Because multiple invoke nodes (not shown) may be connected to the same starting node (e.g., starting node (212)), the formal parameter state (234) may be the union of the parameter states of the actual parameter states connected to the starting node. By propagating the parameter state across compilation unit boundaries, the called compilation unit has a more accurate initial parameter state. Thus, the more accurate parameter state is used to analyze the called compilation unit.

The invoke node (210) may also have an actual return state (236). The actual return state (236) is the parameter state (238) of the returned parameters from a return node (218). The return node (218) corresponds to a return statement. Because multiple return nodes may exist in the called compilation unit, the actual return parameter state (236) may be derived from the parameter states of each of the return nodes that are connected to the invoke node (210). For example, the actual return parameter state may be the union of the parameter states of the return nodes connected to the invoke node (210).

Although FIG. 2 shows a single invoke node, the invoke node may be multiple separate connected nodes, whereby a first node is for the actual parameter state, the second node is for the invocation statement, and the third node is for the actual return parameter state.

Continuing with FIG. 2, edges (e.g., edge (240)) in the flow graph may include predicate edges. Predicate edges (240) maintain a predicate state, which is a binary state that acts as a control signal for the node connected to the predicate edge. The predicate state dictates whether the node is reachable at all based on the parameter states and the statements. In one or more embodiments, the actual value of the input edge does not matter, the parameter state is a binary value that distinguishes between "empty" and "any other value". If the predicate state of an input edge of a node is "empty", the node is not reachable and the predicate state of the output edge of the node has a predicate state of "empty". The value of empty is applied for nodes that assign constants as well as for other nodes. By maintaining predicate states in predicate edges, embodiments may apply additional optimizations by removing code that is not reachable.

While FIGS. 1 and 2 show a configuration of components, other configurations may be used without departing from the scope of the invention. For example, various components may be combined to create a single component. As another example, the functionality performed by a single component may be performed by two or more components.

Figure 3:
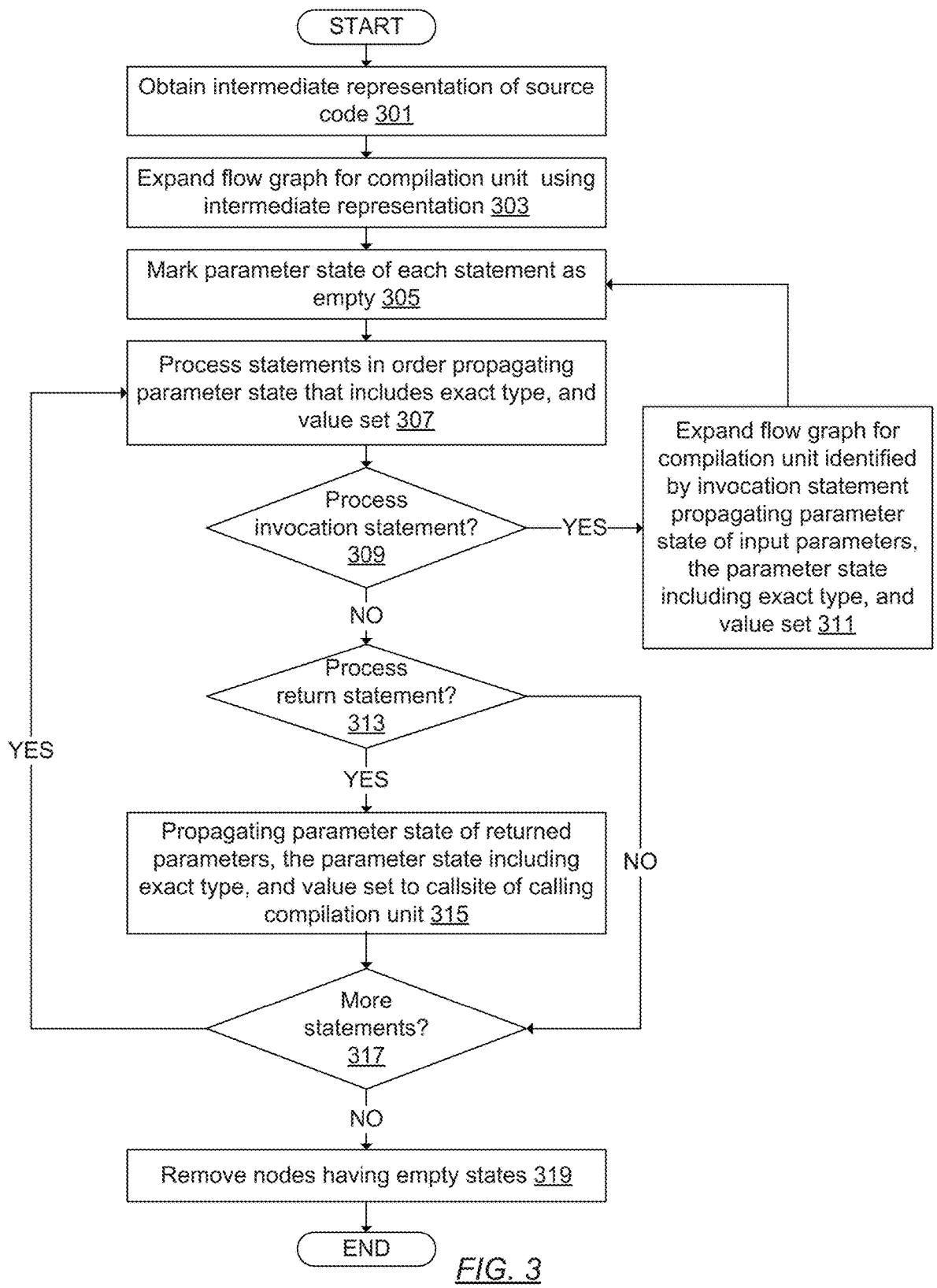
FIG. 3 is a flowchart in accordance with one or more embodiments.

FIG. 3 shows a flowchart in accordance with one or more embodiments. While the various steps in this flowchart are presented and described sequentially, at least some of the steps may be executed in different orders, may be combined or omitted, and at least some of the steps may be executed in parallel. Furthermore, the steps may be performed actively or passively.

In Block 301, an intermediate representation of source code is obtained. A compiler may parse the source code to generate an abstract syntax tree (AST). From the AST, The compiler may generate the intermediate representation graph. Static information specific to the AST node may be precomputed by evaluating the AST nodes. As another example, the compiler generator may obtain the IR graph for the AST node from a repository that stores previously generated IR graphs for AST nodes.

In Block 303, the flow graph is expanded for a compilation unit using the intermediate representation. Initially, the flow graph is expanded to include a compilation unit for the initial method that is executed. Expanding the flow graph adds the statements of the compilation unit to the flow graph. Specifically, a node for each statement in the compilation unit is added to the flow graph. Further, predicate edges are added between the nodes.

In Block 305, the parameter state of each statement of the expanded flow graph is marked as empty. When the flow graph is expanded for the compilation unit, the parameter states of the nodes are marked as empty. Further, the predicate states of edges are marked as empty (e.g., not reachable). Marking states store, in memory, the node or edge with an empty identifier.

In Block 307, the statements are processed in order propagating the parameter states that includes exact type and value set. The compiler iterates through the nodes of the flow graph processing nodes in the projected order of execution of the statements in the nodes. Each statement is evaluated given the value set of the parent node. Evaluating the statement determines the possible output parameter states if the operation of the node were executed. The result of the evaluation is the parameter state of the node. Type information identifying the exact type of objects and variables may be backpropagated through the flow graph. Value sets are forward propagated through the flow graph when processing the next node. Further, if an edge is determined to be possible based on processing the node, the predicate state of the edge is marked as non-empty.

If the statement is a conditional expression, the flow graph may diverge at the node into multiple paths. The conditional expression is evaluated for each flow path to determine which of the flow paths are possible given the incoming parameter states to the node. The predicate state for the edge(s) corresponding to the possible flow path(s) are marked as "any other value" or "non-empty" while the predicate state for the edge(s) corresponding to the flow path(s) from the conditional remain marked as empty. For the possible flow path from a conditional statement, if only a subset of the value set is possible based on the conditional statement, then only the subset is propagated to the next node. For example, consider the example in which the node is for the conditional expression is x>5. At the node, x is determined to have an integer value between 0 and 10, inclusive. Two paths flow from the node. The first path is for x>5 and the second path is for x<=5. Based on the evaluation using the parameter state, both paths are possible, so the predicate states of the predicate edges are marked as non-empty. The parameter state of x propagated along the predicate edges have value sets of 0, 1, 2, 4, and 5 for the first path and 6, 7, 8, 9, and 10 for the second path.

Where paths converge, the value sets for the parameters are the union of the value set from each parent connected to a predicate edge marked as non-empty (i.e., the determined possible flow paths). For example, if three predicate edges lead to the same node and two predicate edges are marked as nonempty while the remaining predicate edge is marked as empty, then the value sets of the parent nodes connected to the two predicate edges marked as non-empty are used for the node and the parent node connected to the empty predicate edge is not used.

Updating the value set of a node may cause the compiler to propagate changes to the child or subsequent nodes. For example, if a node is already processed, and the value set and/or exact type of the parent node of the node is updated, then the update is propagated down to the processed child nodes.

In Block 309, a determination is made whether an invocation statement is processed. During the processing of Block 307, the processing of statements in order may iterate to an invocation node. If the processing iterates to an invocation node, then the invocation node is processed. Specifically, the flow graph is expanded for the compilation unit identified by invocation statement propagating parameter state of input parameters, the parameter state including exact type, and value set in Block 311. Expanding the flow graph may be performed as described in Block 303. Further, when the flow graph is expanded, the parameter states of the compilation unit that is expanded in the flow graph is marked as empty. Similarly, the predicate states are also marked as empty. The flow then returns to Block 307 to process the statements in the expanded compilation unit.

Notably, Blocks 311 and 305 are skipped if the invoked compilation unit invoked by the invocation statement of Block 309 is already processed. In such a scenario, the parameter state is used to update the predicate and parameter states of the previously expanded compilation unit. Namely, the value sets and exact types are updated using the value sets and exact type of the actual parameter state connected to the invocation. Further, the predicate states may be updated if more flow paths are possible through the invoked compilation unit based on the update.

Continuing with FIG. 3, in Block 313, a determination is made whether a return statement is processed while processing statements in Block 307. If the return statement is processed, the flow proceeds to Block 315. In Block 315, the parameter state of returned parameters is propagated to the callsite of each calling compilation unit, whereby the parameter state includes exact type, and value set. Namely, the processing returns to the calling compilation unit with the value set and exact type of the returned parameters. The exact type and value set are propagated through the flow graph.

In Block 317, a determination is made whether more statements exist. If more statements exist, the flow proceeds to continue processing the statements of the flow graph in Block 307. The processing of statements in the nodes continues through each possible flow graph propagating predicate values and parameter states.

If no more statements exist, then the flow proceeds to Block 319. In Block 319, the nodes having empty states are removed. Namely, statements that are associated with an empty parameter state are removed from the code. Other optimized operations, such as inlining compilation units, may be performed. A compiled program is generate as a result of performing various optimizations using the flow graph described herein. The compiled program may be executed. Because the sparse conditional constant propagation is performed across compilation units, the result is more optimized program. Because the more optimized program is created, when the computing system executes the program, the computing system is faster and may use less memory resources.

By performing one or more embodiments, the computer processor executing the compiler is able to create an improved executable.

FIGS. 4A-4D show an example for explanatory purposes only and not intended to limit the scope of the invention.

FIG. 4A is an example of source code (400) of a program in accordance with one or more embodiments. The example is a contrived example that likely does not exist in practice but is shown for the purposes of illustrating one or more embodiments of the invention. For example, the loop in the compute method is unnecessary and would be removed when applying loop peeling. For the purpose of the example, assume that no method inlining is done in this example, because inlining the method "compute" into "main" would also eliminate the loop. Those skilled in the art will appreciate that a program in actuality may have hundreds of thousands of lines of code, which a human is unable to evaluate due to size and complexity.

Figure 4B:
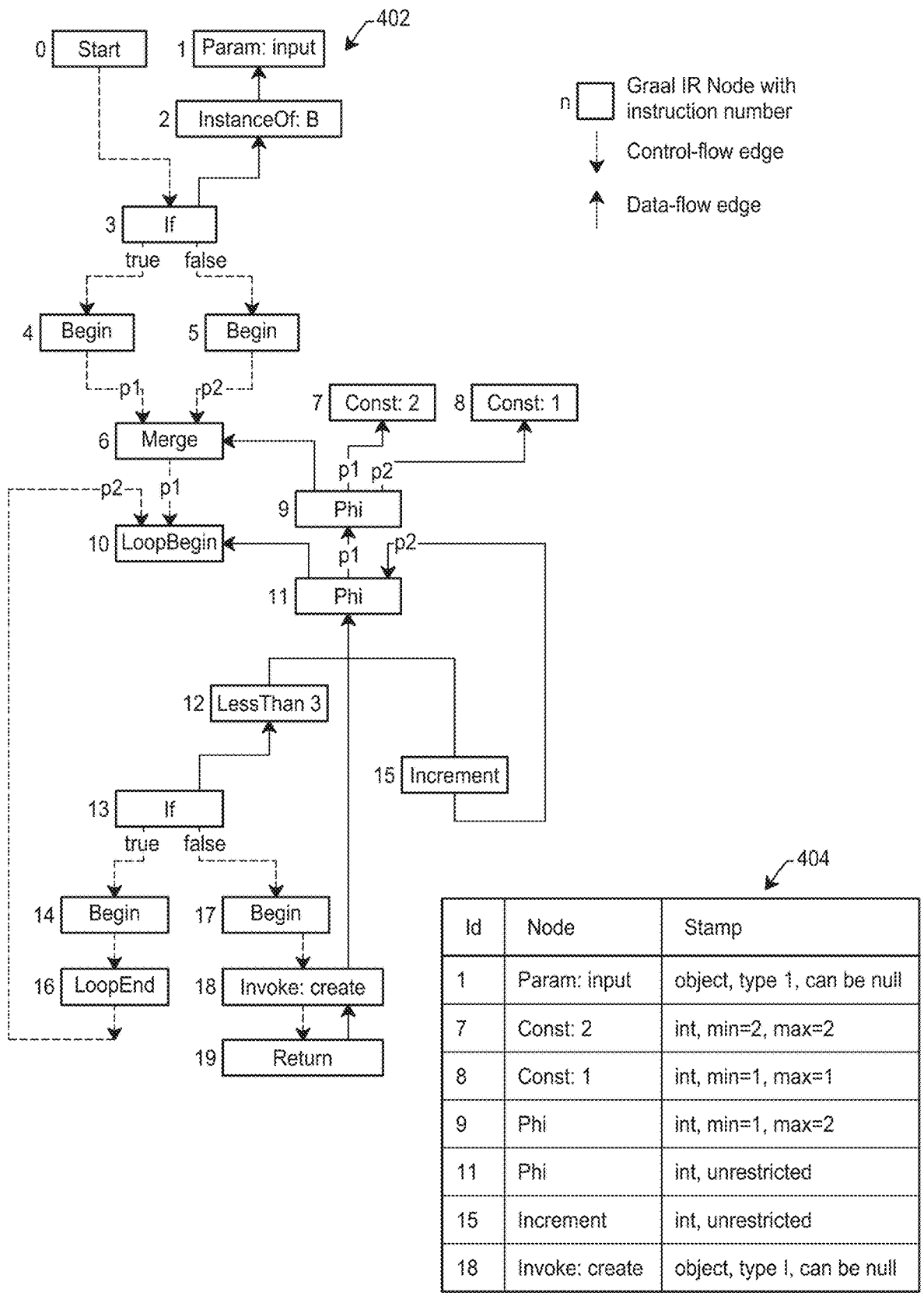

FIG. 4B is an example of an IR graph (402) of the source code (400 of FIG. 4A) in accordance with one or more embodiments. The IR graph is a GraalIR graph for the GRAAL compiler for the "compute" method of FIG. 4A. The numbering of the instructions is arbitrary and not implying any order. When referring to a node of the IR Graph, the instruction number is used. For example, the first If node after "0 Start" is "3 If", which uses as its condition the "2 InstanceOf". To simplify the graph (402), a few nodes are combined. For example, node "12 lessThan 3" would have the constant with 3 as a separate input node, but is omitted to avoid complicating the example graph with that constant node and its connecting edge. Also, for technical reasons the GraalIR uses data flow edges instead of control flow edges for some of the control flow, for example the loop back-edge (so that the control flow graph remains free for cycles). For clarity, the graph shown uses control flow edges for everything resembling control flow.

In SSA form, every value in the method has only a single definition. So-called "phi functions" are used to merge variables defined in multiple branches, i.e., the phi function is the new single definition of a value that is different in the predecessors of a block. In the GraalIR, phi functions have one input that points-to the control flow merge that the phi belongs to, as well as many inputs as that control flow merge has predecessors. The phi functions in the example only have two inputs and labels p1 and p2 are used to match the control flow predecessors and the value of the phi function for that predecessor.

Each GraalIR instruction has type information about the value it produces. In order to not confuse the compiler, IR type information (which is present for instructions that produce object values and primitive values) with "types" in the sense of class hierarchies, the type information of a compiler IR instruction as the "stamp" of the instruction. The stamp is a parameter state. The stamp for a primitive integer value is, e.g., a value range specifying the minimum and maximum value, and/or bit-masks of bits that are always 1 or 0 in the value. If the minimum and maximum value are the same, then the value is actually a constant. The stamp for an object value is either a single declared type ("this type or any subtype") or a single exact type ("exactly this type, not even a subtype"), together with information if the value can ever be null.

At the bottom of the stamp hierarchy is a "bottom" stamp, meaning the value is unrestricted. In a strongly typed language like Java, there is always information whether a value is primitive or an object, so there are multiple "bottom" primitive stamps and a single bottom object stamp.

FIG. 4B also shows a table (404) with the stamps determined from the IR Graph. The Id in the table corresponds to the instruction number in the IR Graph. The stamp for the phi function "9 Phi" is a narrow range because it is the union of two constants. On the other hand, the stamp of "11 Phi" is unrestricted because of the addition in the loop. Namely, even though the start value of the loop is known, the addition can lead to an arbitrary end value (including negative values due to integer overflow).

Embodiments combine points-to analysis with sparse conditional constant propagation. The points-to analysis generates a whole-program type-flow and value flow graph where types are propagated from sources (object allocation sites, literal constants) to sinks (memory accesses, function calls). Points-to analysis (a) identifies all types, methods, and fields that are reachable in the application, i.e., the minimum set of elements that need to be compiled so that the application can run; (b) identifies the receiver types of virtual call sites, so that a call can be de-virtualized if there is only a single callee found; identifies the state of values flowing into null checks and instance of type checks, so that these checks can be eliminated if they always pass (or always fail); and propagates constant values around so that after point-to analysis values can be constant folded.

Before embodiments described herein, compiler optimizations, both in ahead-of-time and just-in-time compilers, are usually applied for a single compilation unit. With the help of method inlining, a compilation unit is usually much larger than a single method in source code. But still, a compilation unit is many orders of magnitude smaller than the whole program. SCCP is an optimization that requires a compiler IR in SSA form. In the stamp hierarchy, a special "top" stamp is introduced, which we call the "empty stamp". It means that the instruction has currently no feasible value at all. Since the execution of every instruction produced a concrete value, an instruction with an empty stamp means that the instruction is not executable, i.e., dead code.

Points-to analysis and sparse conditional constant propagation are similar in that both are fixed-point operations that gradually propagate information down usage edges. Combining points-to analysis with sparse conditional constant propagation performs the following. From the point of view of a points-to analysis, the analysis is extended to also cover primitive values and branch predicates. From the point of view of SCCP, the scope is extended from one compilation unit to the whole program.

The precision of prior SCCP on one compilation unit is held back by the following initial sources of unprecise stamp information: The method parameters have a stamp according to the declared types of the method parameters. Similarly, the return value of a method invocation has a stamp according to the declared return type of the invoked method. One or more embodiments removes these imprecisions by propagating information across the whole application. This means that method parameters have initially an empty stamp, until a more concrete stamp is propagated in from a caller. Similarly, the return value of a method invocation initially has an empty stamp, until a more concrete stamp is propagated in from the invoked method.

Figure 4C:
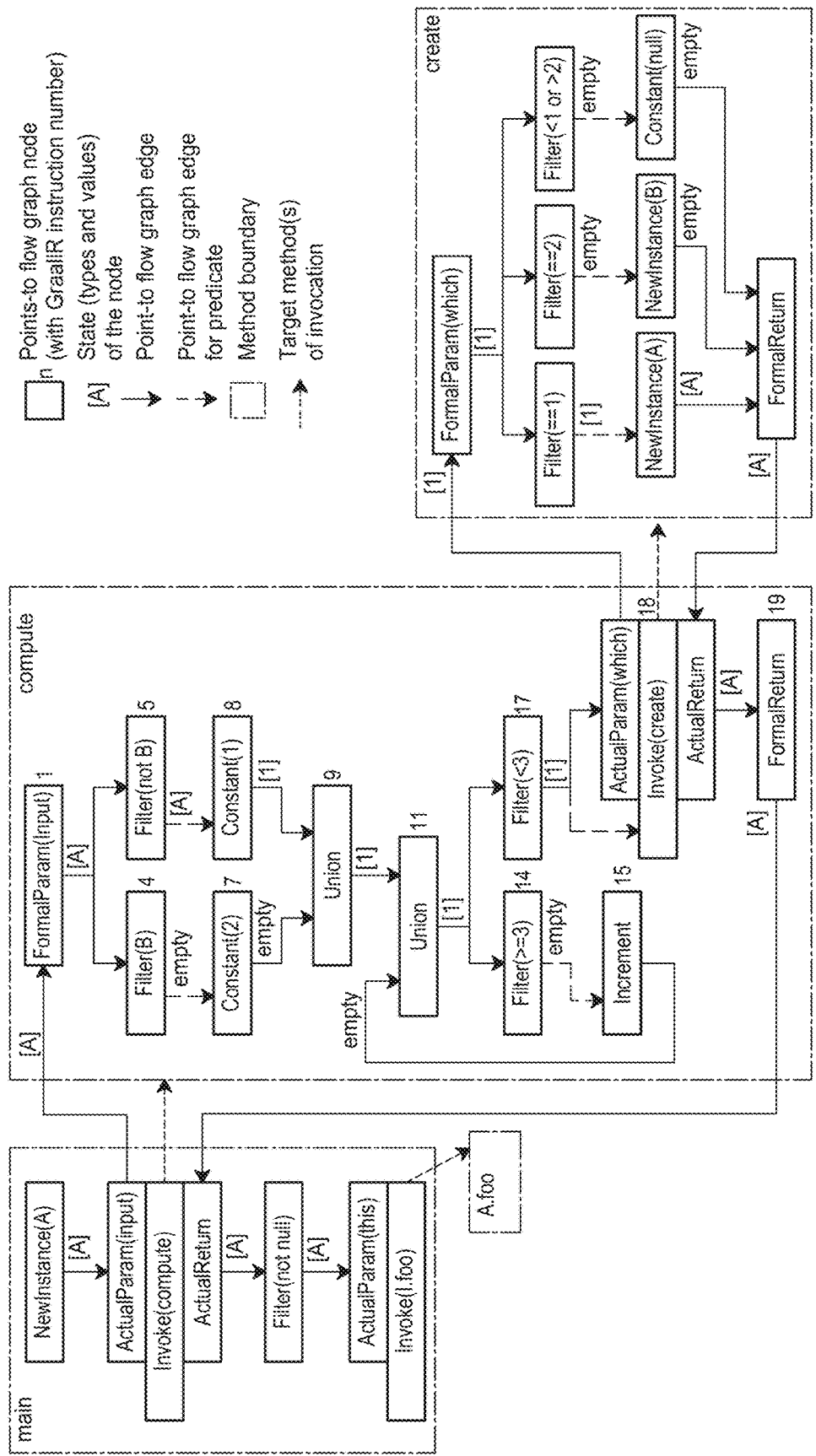

FIG. 4C shows the new flow graph (408) of the static analysis performed using embodiments described herein. In addition to additional nodes, a new kind of edge (i.e., predicate edges) are added in the graph. Predicate edges determine if a node is reachable at all, shown in thicker lines. Every node can have predicate inputs dictating the predicate states. For such predicate inputs, the actual value of the input edge does not matter, rather, the predicate state distinguishes between "empty" and "any other value." As long as the predicate input of a node is "empty", the node is not reachable and it produces the value "empty". This applies even for traditional sources of values like constants and allocation sites. For example, the "Constant(2)" does not produce the value "2" but "empty", because the predicate input of the node is still empty.

FIG. 4C shows the value sets produced by each node after the static analysis has reached a fixed point (e.g., the analysis is complete). The parameter states shown in FIG. 4C are the types and values proven by the analysis.

Using FIGS. 4A and 4B in conjunction with FIG. 4C, the input parameter of method "compute" only has the type "A". Therefore, the instance of "Filter(B)" remains empty, keeping the "Constant(2)" unreachable. Based on these values, the invocation of "create" is always reachable, i.e., the "if (x<3)" never fails. Based on that, the increment of variable x remains unreachable. Since this proves that the parameter of method "create" can only be the value "1", only the allocation of type "A" is reachable. Therefore, method "create" only returns type "A", so also method "compute" only returns type "A". Consequently, types "B" and "C" are still unreachable, and the invocation of method "I.foo" only has one reachable callee: "A.foo" as shown in the flow graph (408) of FIG. 4C.

The resulting stamps or parameter states of the cross compilation unit sparse conditional constant propagation is shown in table (410) of FIG. 4D. Specifically, table (410) shows a side by side comparison of the original stamps from table (404) of FIG. 4B as compared to the analysis performed using embodiments described herein and illustrated in flow graph of FIG. 4C.

To handle scalability, usually an application contains more variables of primitive types than object types. In such a scenario, extending a points-to analysis to also process primitive values can lead to scalability problems and increase the memory footprint of the analysis significantly. One or more embodiments may perform the following mitigations to keep the analysis time and memory footprint acceptable:

To avoid problems where the range of a primitive value slowly creeps up to an eventual large range (like when a loop variable is always incremented by one), state updates are limited to a fixed maximum threshold number of times. The fixed maximum threshold may be any number that is determined to maintain scalability in accordance with one or more embodiments. In some embodiments, the threshold is one. Specifically, in such embodiments, at most one constant value is tracked per variable. In such embodiments, every primitive value can have only three states: (a) The initial "empty" value; (b) One constant when the value gets a constant assigned; and (c) "unrestricted when there is more than the one initial constant value. Once a node reaches the "unrestricted" state, the node can also be removed from the points-to flow graph because the node neither contributes valuable information that can be used later on for optimizations, nor can its state ever change again. Removing the node from the graph allows the memory for the saturated nodes (i.e., memory used to store nodes that have unrestricted states) to be freed.

Further, it may also be likely that arithmetic operations end up saturated. Namely, code patterns where, for example, both operands of an addition end up as constants are unlikely. Therefore, some embodiments saturate all arithmetic operations, i.e., arithmetic operations either have the "empty" value or are "unrestricted", with no step in between in order to have scalability. Distinguishing "empty" and "unrestricted" maintains the benefit of embodiments described herein. By way of an example, in the example of FIG. 4C, the node for the addition "15 Increment" flows into "11 Phi". If the addition did not have the empty state, the phi function would also saturate and all benefits shown in the example would be lost.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504), persistent storage (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing units (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (512). The inputs may include text input, audio input, video input, etc., which may be processed and transmitted by the computing system (500) in accordance with the disclosure. The communication interface (508) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (512) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    while compiling a program:
        expanding a flow graph of a first compilation unit of the program,
        marking a first plurality of corresponding parameter states of a first plurality of statements of the first compilation unit as empty,
        processing the first plurality of statements to update the first plurality of corresponding parameter states with an exact type and a value set, wherein processing the first plurality of statements comprises:
            tracking a control flow predicate of a block in the first compilation unit, wherein the block comprises a first subset of the first plurality of statements,
            only after the control flow predicate indicates that the block is executable:
                processing an invocation statement in the first subset of the first plurality of statements, and
                expanding, responsive to the invocation statement, the flow graph for a second compilation unit of the program that is identified by the invocation statement,
                wherein expanding the flow graph comprises propagating the exact type and the value set of an actual parameter state to a formal parameter state of an input parameter of the second compilation unit, the actual parameter state in the first plurality of corresponding parameter states, and
        optimizing the program using the first plurality of corresponding parameter states to generate a compiled program.

2. The method of claim 1, further comprising:
    executing the compiled program.

3. The method of claim 1, wherein optimizing the program comprises:
    removing, after processing the first plurality of statements, a second subset of the first plurality of statements, the second subset having a corresponding parameter state of the first plurality of corresponding parameter states that are empty.

4. The method of claim 1, further comprising:
    marking a second plurality of corresponding parameter states of a second plurality of statements of the second compilation unit as empty,
    processing the second plurality of statements to update the exact type and the value set of each of the second plurality of corresponding parameter states.

5. The method of claim 1, further comprising:
    processing a return statement of a second plurality of statements; and
    propagating the exact type and value set of a returned parameter to a parameter state of the first plurality of corresponding parameter states of the first compilation unit.

6. The method of claim 5, wherein the exact type and value set of the returned parameter is set to empty prior to propagating the exact type and value set.

7. The method of claim 1, wherein the value set comprises a primitive value.

8. The method of claim 1, wherein the value set comprises a constant value.

9. A computing system comprising:
    at least one computer processor; and
    a compiler executing on the computer processor for performing operations comprising:
        expanding a flow graph of a first compilation unit of a program, marking a first plurality of corresponding parameter states of a first plurality of statements of the first compilation unit as empty, processing the first plurality of statements to update the first plurality of corresponding parameter states with an exact type and a value set, wherein processing the first plurality of statements comprises:

processing an invocation statement of the first plurality of statements, and expanding, responsive to the invocation statement, the flow graph for a second compilation unit of the program, wherein the second compilation unit is identified by the invocation statement, wherein expanding the flow graph comprises propagating the exact type and the value set of an actual parameter state to a formal parameter state of an input parameter of the second compilation unit, the actual parameter state in the first plurality of corresponding parameter states, wherein the value set comprises at least one of a primitive value and a constant value, and optimizing the program using the first plurality of corresponding parameter states to generate a compiled program.

10. The computing system of claim 9, wherein optimizing the program comprises:

removing, after processing the first plurality of statements, a subset of the first plurality of statements, the subset having a corresponding parameter state of the first plurality of corresponding parameter states that are empty.

11. The computing system of claim 9, wherein the operations further comprises:

marking a second plurality of corresponding parameter states of a second plurality of statements of the second compilation unit as empty, processing the second plurality of statements to update the exact type and the value set of each of the second plurality of corresponding parameter states.

12. The computing system of claim 9, wherein the operations further comprises:

processing a return statement of a second plurality of statements; and propagating the exact type and value set of a returned parameter to a parameter state of the first plurality of corresponding parameter states of the first compilation unit.

13. The computing system of claim 12, wherein the exact type and value set of the returned parameter is set to empty prior to propagating the exact type and value set.

14. The computing system of claim 9, wherein processing the first plurality of statements comprises:

tracking a control flow predicate of a block in the first compilation unit; and processing a subset of the first plurality of statements, the subset in the block, only after the control flow predicate indicates that the block is executable.

15. A non-transitory computer readable medium comprising computer readable program code for causing a computer system to perform operations comprising:

expanding a flow graph of a first compilation unit of the program, marking a first plurality of corresponding parameter states of a first plurality of statements of the first compilation unit as empty, processing the first plurality of statements to update the first plurality of corresponding parameter states with an exact type and a value set, wherein processing the first plurality of statements comprises:

processing an invocation statement of the first plurality of statements, and expanding, responsive to the invocation statement, the flow graph for a second compilation unit of the program, wherein the second compilation unit is identified by the invocation statement, wherein expanding the flow graph comprises propagating the exact type and the value set of an actual parameter state to a formal parameter state of an input parameter of the second compilation unit, the actual parameter state in the first plurality of corresponding parameter states, wherein the value set comprises at least one of a primitive value and a constant value, and optimizing the program using the first plurality of corresponding parameter states to generate a compiled program.

16. The non-transitory computer readable medium of claim 15, wherein optimizing the program comprises:

removing, after processing the first plurality of statements, a subset of the first plurality of statements, the subset having a corresponding parameter state of the first plurality of corresponding parameter states that are empty.

17. The non-transitory computer readable medium of claim 15, wherein the operations further comprising:

marking a second plurality of corresponding parameter states of a second plurality of statements of the second compilation unit as empty, processing the second plurality of statements to update the exact type and the value set of each of the second plurality of corresponding parameter states.

18. The non-transitory computer readable medium of claim 15, wherein the operations further comprising:

processing a return statement of a second plurality of statements; and propagating the exact type and value set of a returned parameter to a parameter state of the first plurality of corresponding parameter states of the first compilation unit.

19. The non-transitory computer readable medium of claim 18, wherein the exact type and value set of the returned parameter is set to empty prior to propagating the exact type and value set.

20. The non-transitory computer readable medium of claim 15, wherein processing the first plurality of statements comprises:

tracking a control flow predicate of a block in the first compilation unit; and processing a subset of the first plurality of statements, the subset in the block, only after the control flow predicate indicates that the block is executable.

* * * * *

UNITED STATES PATENT AND TRADEMARK OFFICE
CERTIFICATE OF CORRECTION

PATENT NO. : 12,242,832 B1  
APPLICATION NO. : 18/452842  
DATED : March 4, 2025  
INVENTOR(S) : Wimmer et al.

Page 1 of 1

It is certified that error appears in the above-identified patent and that said Letters Patent is hereby corrected as shown below:

In the Specification

In Column 1, Line 29, delete "call-site" and insert -- call_site --, therefor.

In Column 10, Line 3, delete "instance of" and insert -- instanceof --, therefor.

In Column 10, Line 63, delete "instance of" and insert -- instanceof --, therefor.

In Column 11, Line 22, delete "acceptable:" and insert -- acceptable. --, therefor.

In Column 11, Line 34, delete ""unrestricted" and insert -- "unrestricted" --, therefor.

In Column 13, Line 52, delete "an or" and insert -- "and or" --, therefor.

Signed and Sealed this  
Third Day of June, 2025

Coke Morgan Stewart  
*Acting Director of the United States Patent and Trademark Office*